United States Patent
Ando et al.

(10) Patent No.: US 8,795,421 B2
(45) Date of Patent: Aug. 5, 2014

(54) W/O EMULSION INK FOR INKJET

(71) Applicant: Riso Kagaku Corporation, Tokyo (JP)

(72) Inventors: Kazuyuki Ando, Tokyo (JP); Naofumi Ezaki, Tokyo (JP); Shinichiro Shimura, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 13/628,281

(22) Filed: Sep. 27, 2012

(65) Prior Publication Data

US 2013/0074727 A1    Mar. 28, 2013

(30) Foreign Application Priority Data

Sep. 28, 2011 (JP) ................................ 2011-212320
Sep. 29, 2011 (JP) ................................ 2011-213982

(51) Int. Cl.
*C09D 11/02*      (2014.01)
(52) U.S. Cl.
USPC ................................... 106/31.26; 106/31.25
(58) Field of Classification Search
USPC ........................................... 106/31.26, 31.25
See application file for complete search history.

(56) References Cited

U.S. PATENT DOCUMENTS

| 7,717,989 | B2 | 5/2010 | Okuda et al. | |
|---|---|---|---|---|
| 2009/0090270 | A1* | 4/2009 | Okuda et al. | 106/31.26 |
| 2009/0196994 | A1* | 8/2009 | Endo | 427/256 |
| 2010/0092676 | A1* | 4/2010 | Uozumi et al. | 427/265 |
| 2012/0125227 | A1 | 5/2012 | Ezaki et al. | |

FOREIGN PATENT DOCUMENTS

| JP | H09296141 A | 11/1997 |
|---|---|---|
| JP | 2006-56931 A | 3/2006 |
| JP | 2009-57462 A | 3/2009 |

* cited by examiner

*Primary Examiner* — Veronica F Faison
(74) *Attorney, Agent, or Firm* — Fitch, Even, Tabin & Flannery LLP

(57) ABSTRACT

A water-in-oil (W/O) emulsion ink having an ejection performance suitable for inkjet printing and superior storage stability at high temperature includes as emulsifiers, a polyglyceryl fatty acid ester (A) having a fatty acid moiety is isostearic acid or oleic acid with an HLB value of 7-14 and a glycerol polymerization degree of not less than 4, at least one nonionic surfactant (B) selected from (B-a) an esterification product of an organic compound with 3-5 hydroxyl groups and a fatty acid having 18 carbon atoms, (B-b) an alkyl glyceryl ether, (B-c) a diterpene alcohol and (B-d) a sucrose fatty acid ester having an HLB value of not more than 13.

23 Claims, No Drawings

W/O EMULSION INK FOR INKJET

This U.S. application claims the foreign priority filing date benefit of Japanese Application JP2011-212320, filed Sep. 28, 2011, and Japanese Application JP 2011-213982, filed Sep. 29, 2011, and the full disclosure of each said Japanese application is incorporated herein by reference.

TECHNICAL FIELD

The present invention relates to a water-in-oil (W/O) emulsion ink which is suitable for use in inkjet printing and is superior in storage stability.

BACKGROUND ART

Inkjet printing is characterized by ejecting ink droplets from fine nozzles so as to perform non-contact printing. Companies have carried out R & D of inks for inkjet printing, aiming at making ink droplets finer and making printing speed faster and printing size larger.

As an ink used for inkjet printing (referred to as "ink for inkjet" in the present specification), an aqueous pigment or dye ink is generally used for personal and office uses. Because of high water-absorption of paper fibers, the aqueous pigment or dye ink exhibits high printing density thereon and is low in strike through which is a printing density seen from the backside of prints. On the other hand, since paper is dried under pressure during production, hydrogen bonds between paper fibers are cut to cause curl of paper when water contacts the paper. The curl is so remarkable as to influence accuracy of positioning of ink droplets and conveyance of paper when cut sheets of paper are used. It is prerequisite to eliminate the curl in order to achieve high speed printing.

As a technique for eliminating the curl, reducing the water content of the ink or removing water from the ink may be employed. In other words, oil based inks can be used to eliminate the curl, which are also suited for high speed printing.

Business printers which adopt a line head type inkjet system are noticed since they have the head fixed so as to produce a large amount of prints at high speed and are available at low price. An oil based pigment ink is usually used for this high speed inkjet printer. However, the ink permeates into the backside of paper after printing, and thus the resulting prints are low in printing density with lots of strike through, compared to printers adopting other systems.

Emulsifying an oil based pigment ink with water to make a water-in-oil (W/O) emulsion ink is one of the methods for solving this problem (refer to Patent Documents 1 and 2). Although a polyglyceryl hydroxy fatty acid ester with an HLB value of 3-5 is used as an emulsifier in the emulsion ink in Patent Document 1, ejection performance and storage stability are not necessarily sufficient.

[Patent Document 1] JP-A-2006-56931
[Patent Document 2] JP-A-2009-57462

DISCLOSURE OF THE INVENTION

Problems to be Solved by the Invention

As a result of diligent researches for the above mentioned purpose, the present inventors have found that a water-in-oil (W/O) emulsion ink for inkjet, which is superior in ejection performance and storage stability, can be obtained by using a specific polyglyceryl fatty acid ester as an emulsifier in the water-in-oil (W/O) emulsion ink, have finally completed the present invention, and applied for a patent (United States Patent Publication No. 2012/0125227A1), but further improvement has been required in terms of high temperature storage stability of the ink.

The object of the present invention is to provide a water-in-oil (W/O) emulsion ink which is suitable for inkjet printing and is superior in storage stability at high temperature while maintaining ejection performance.

Means for Solving the Problem

As a result of diligent researches for the above mentioned purpose, the present inventors have found that a water-in-oil (W/O) emulsion ink for inkjet, which is superior in storage stability at high temperature, can be obtained by using a specific polyglyceryl fatty acid ester together with a specific nonionic surfactant as emulsifiers in the water-in-oil (W/O) emulsion ink, and have finally completed the present invention.

That is, according to the first aspect of the present invention, there is provided a water-in-oil (W/O) emulsion ink for inkjet, having a water phase dispersed in an oil phase by use of a specific polyglyceryl fatty acid ester (A) together with a specific nonionic surfactant (B) as emulsifiers, in which the fatty acid moiety of the polyglyceryl fatty acid ester (A) is oleic acid or isostearic acid, the polyglyceryl fatty acid ester (A) has an HLB value of 7-14 and a glycerol polymerization degree of not less than 4, and the nonionic surfactant (B) is at least one selected from the group consisting of (B-a) an esterification product of an organic compound with 3-5 hydroxyl groups and a fatty acid with 18 carbon atoms, (B-b) an alkyl glyceryl ether, (B-c) a diterpene alcohol and (B-d) a sucrose fatty acid ester having an HLB value of not more than 13.

In addition, as a result of diligent researches for the above mentioned purpose, the present inventors have found that a water-in-oil (W/O) emulsion ink for inkjet, which is superior in storage stability at high temperature, can be obtained by using a specific polyglyceryl fatty acid ester (A) as an emulsifier in the water-in-oil (W/O) emulsion ink, dispersing a pigment into the oil phase and dissolving a water soluble dye in the water phase, and have finally completed the present invention.

That is, according to the second aspect of the present invention, there is provided a water-in-oil (W/O) emulsion ink for inkjet, having a water phase dispersed in an oil phase by use of a polyglyceryl fatty acid ester (A) as an emulsifier, in which the fatty acid moiety of the polyglyceryl fatty acid ester (A) is oleic acid or isostearic acid, and the polyglyceryl fatty acid ester (A) has an HLB value of 7-14, the ink further comprising a pigment in the oil phase and a water soluble dye in the water phase.

Effect of the Invention

According to the first aspect of the present invention, a water-in-oil (W/O) emulsion ink for inkjet, which is superior in storage stability at high temperature while maintaining ejection performance, is obtained because a specific polyglyceryl fatty acid ester (A) is used together with a specific nonionic surfactant (B) as emulsifiers for forming the water-in-oil (W/O) emulsion ink.

According to the second aspect of the present invention, a water-in-oil (W/O) emulsion ink for inkjet, which is superior in storage stability at high temperature while maintaining ejection performance, is obtained because a specific polyglyceryl fatty acid ester (A) is used as an emulsifier for forming the water-in-oil (W/O) emulsion ink, a pigment is contained in the oil phase, and a water soluble dye is contained in the water phase.

Mode for Carrying Out the Invention

Hereinafter, the present invention will be described in detail.

The water-in-oil (W/O) emulsion ink of the present invention is obtained by mixing an oil phase and a water phase so as to disperse the water phase as fine particles in the oil phase.

The oil phase is mainly composed of an organic solvent, a coloring agent and an emulsifier, but may contain other components if necessary.

Any of non-polar solvents and polar solvents may be used as the organic solvent. These solvents can be used alone or in combination of two or more on condition that they form a single phase. Favorably, the organic solvent is mainly composed of a non-polar solvent, and comprises preferably 40-100 mass % of a non-polar solvent and 0-60 mass % of a polar solvent, more preferably 50-100 mass % of a non-polar solvent and 0-50 mass % of a polar solvent, and particularly preferably 70-100 mass % of a non-polar solvent and 0-30 mass % of a polar solvent.

As the non-polar solvent, petroleum based hydrocarbon solvents including naphthenic, paraffinic and isoparaffinic ones can be used. Concrete examples include dodecane and other aliphatic saturated hydrocarbons, "ISOPAR and EXXOL" (both trade names) available from Exxon Mobil Corporation, "AF solvents" (trade name) available from JX Nippon Oil & Energy Corporation, and "SUNSEN and SUNPAR" (both trade names) available from Japan Sun Oil Company, Ltd. These can be used alone or in combination of two or more.

As the polar solvent, ester solvents, alcohol solvents, fatty acid solvents and ether solvents can be used, for example. These can be used alone or in combination of two or more.

The ester solvents includes, for example, higher fatty acid esters having 5 or more, preferably 9 or more and more preferably 12 to 32 carbon atoms in one molecule. Examples include isodecyl isononate, isotridecyl isononate, isononyl isononate, methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecylpivalate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylolpropane tri-2-ethylhexanoate, and glyceryl tri-2-ethylhexanoate.

The alcohol solvent includes, for example, aliphatic higher alcohols having 12 or more carbon atoms in one molecule. Concrete examples include higher alcohols such as isomyristyl alcohol, isopalmityl alcohol, isostearyl alcohol, and oleyl alcohol.

The fatty acid solvent includes, for example, fatty acids having 4 or more, preferably 9-22 carbon atoms in one molecule. Examples include isononanoic acid, isomyristic, acid, hexadecanoic acid, isopalmitic acid, oleic acid, and isostearic acid.

Examples of the ether solvents include glycol ethers such as diethyleneglycol monobutyl ether, ethyleneglycol monobutyl ether, propyleneglycol monobutyl ether and propyleneglycol dibutyl ether, and acetate of glycol ethers.

As a coloring agent, any of dyes and pigments can be used. These can be used alone or in combination. According to the present invention, storage stability at high temperature can be improved by allowing a pigment to be contained in the oil phase whilst allowing a dye to be contained in the water phase. In the above second aspect of the present invention, the pigment is necessarily used as a coloring agent in the oil phase, and a dye may be used in combination in the oil phase.

As the pigment, pigments generally used in the printing industry, including organic and inorganic pigments, can be used without any particular limitation. Examples thereof include carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, thioindigo pigments, quinophthalone pigments and metal complex pigments. These pigments may be used alone or in combination of two or more. In particular, for black inks, carbon black is preferably used as the pigment.

When a dye is used in the oil phase, oil-soluble dyes such as azo, anthraquinone and azine based dyes can be used as the dye.

The coloring agent is contained preferably in an amount of 0.01 to 20 mass % based on the total of the ink.

When a pigment is used as a coloring agent, it is preferable to add a pigment dispersing agent to the oil phase in order to make good dispersion of the pigment in the oil phase. The pigment dispersing agents used in the present invention are not particularly limited as long as they can stably disperse the pigment in a solvent. Examples thereof include a hydroxyl group-containing carboxylic acid ester, a salt of a long-chain polyaminoamide and a high-molecular-weight acidic ester, a salt of a high-molecular-weight polycarboxylic acid, a salt of a long-chain polyaminoamide and a polar acidic ester, a high-molecular-weight unsaturated acid ester, a high-molecular-weight copolymer, a modified polyurethane, a modified polyacrylate, a polyetherester type anionic surfactant, a naphthalene sulfonic acid formalin condensate salt, a polyoxyethylene alkylphosphoric acid ester, a polyoxyethylene nonylphenyl ether, a polyesterpolyamine, a stearylamine acetate and the like. Among these, polymer dispersing agents are preferable.

Concrete examples of the dispersing agents include "SOLSPERSE 5000 (phthalocyanine ammonium salt based), 13940 (polyester amine based), 17000, 18000 (aliphatic amine based), 11200, 22000, 24000, and 28000" (all trade names) available from Lubrizol Japan Ltd.; "EFKA 400, 401, 402, 403, 450, 451, 453 (modified polyacrylate), 46, 47, 48, 49, 4010, 4055 (modified polyurethane)" (all trade names) available from Efka Chemicals; "DEMOL P, EP, POIZ 520, 521, 530, HOMOGENOL L-18 (polycarboxylate polymer type surfactants)" (all trade names) available from Kao Corporation; "DISPARLON KS-860, KS-873N4 (polyester amine salt)" (both trade names) available from Kusumoto Chemicals, Ltd.; and "DISCOL 202, 206, OA-202, OA-600 (multichain polymeric nonionic based)" (all trade names) available from Daiichi Kogyo Seiyaku Co., Ltd.

The pigment dispersing agents may be contained in an amount sufficient to disperse the pigment in the oil phase, and can be set properly.

As an emulsifier, a polyglyceryl fatty acid ester (A) the fatty acid moiety if which is oleic acid or isostearic acid and which has an HLB value of 7-14 and preferably has a glycerol polymerization degree of not less than 4 is used as an essential component, and preferably, at least one nonionic surfactant (B) selected from the group consisting of the following (B-a) to (B-d) are used together. Further, one or more other emulsifiers may be used. Meanwhile, in the above first aspect of the present invention, the above polyglyceryl fatty acid ester (A) is used together with the above nonionic surfactant (B) as essential components.

(B) Nonionic Surfactant:

(B-a) an esterification product of an organic compound with 3-5 hydroxyl groups and a fatty acid with 18 carbon atoms, (B-b) an alkyl glyceryl ether, (B-c) a diterpene alcohol, and (B-d) a sucrose fatty acid ester having an HLB value of not more than 13.

The polyglyceryl fatty acid ester herein means an esterification product of a polyglycerol with a fatty acid. When the polyglyceryl fatty acid ester does not satisfy the above requirements of the present invention, ejection performance and storage stability are inferior. The fatty acid moiety is preferably isostearic acid because it greatly improves both ejection performance and storage stability.

The above polyglyceryl fatty acid ester (A) has a glycerol polymerization degree of not less than 4, preferably 4-20 and more preferably 6-16, and preferably has several (for example, 1-3) higher fatty acid moieties which are ester-bonded to one molecule of the above polyglycerol moiety. Also, the above polyglyceryl fatty acid ester has an organic value of preferably 550-2300 and an inorganic value of preferably 600-2500. More preferably, it has an organic value of 550-1700 and an inorganic value of 600-1300. When the organic value is larger than 2300 or the inorganic value is larger than 2500, ink viscosity may become high. Preferred examples of the polyglyceryl fatty acid ester include tetraglyceryl monooleate, hexaglyceryl monooleate, decaglyceryl trioleate, tetraglyceryl monoisostearate, hexaglyceryl monoisostearate and decaglyceryl diisostearate.

As the above esterification product (B-a) of an organic compound with 3-5 hydroxyl groups and a fatty acid with 18 carbon atoms, an esterification product of a monoglycerol or polyglycerol with a glycerol polymerization degree of not more than 3 and a fatty acid, a sorbitan fatty acid ester or a pentaerythritol fatty acid ester is preferable. Concrete examples include glyceryl monoisostearate, glyceryl monooleate, diglyceryl monoisostearate, diglyceryl monooleate, diglyceryl diisostearate, diglyceryl triisostearate, sorbitan monostearate, sorbitan monooleate, sorbitan monoisostearate, sorbitan sesquioleate, sorbitan sesquiisostearate, sorbitan dioleate, sorbitan trioleate, sorbitan tristearate, pentaerythritol monostearate and pentaerythritol monooleate.

The above alkyl glyceryl ether (B-b) is preferably one having an alkyl group with 16-18 carbon atoms. Concrete examples include myristyl glyceryl ether, palmityl glyceryl ether, stearyl glyceryl ether, oleyl glyceryl ether and isostearyl glyceryl ether.

The above diterpene alcohol (B-c) is preferably one having no cyclic structure, and more preferably phytantriol, isophytol or phytol.

The above sucrose fatty acid ester (B-d) is one with an HLB value of not more than 13. The sucrose fatty acid ester is a mixture of monoester and polyester, and since the HLB value is determined by the mixing ratio, a product with an HLB value of not more than 13 can be used alone, or alternatively, a plurality of products which are mixed in a mixing ratio that adjusts the HLB to not more than 13 can be used. Concrete examples include sucrose laurate, sucrose myristate, sucrose stearate, sucrose oleate and sucrose erucate.

The mixing ratio of a polyglyceryl fatty acid ester (A) to a nonionic surfactant (B) is preferably (A):(B)=50-95:50:-5 and more preferably (A):(B)=50-90:50-10.

Meanwhile, the "organic value" and the "inorganic value" are based on the notion used in the "organic conception diagram" proposed by Atsushi Fujita, in which nature of organic compounds is categorized by two factors of "organic nature" derived from the chain of covalent bonds of carbon chains and "inorganic nature" derived from the influence of electrostatic properties in substituents (functional groups), and each factor is determined from the structure of compounds and converted to numerical values. Details of the "organic conception diagram" are described in "Systematic Qualitative Organic Analysis (Mixtures)", Atsushi Fujita et al., Kazama Shobo Co., Ltd. (1974).

The HLB value is a theoretical value calculated by the following equation (1). As an exception, the HLB value of the sucrose fatty acid ester is a catalog value which is calculated by the Atlas method (the following equation (2)).

$$HLB=(\text{inorganic value/organic value})\times 10 \quad (1)$$

$$HLB=20\times(1-\text{saponification value/neutralization value}) \quad (2)$$

The amount of the emulsifier to be used in the present invention on solid mass basis is preferably 0.5 to 40 mass %, more preferably 1-30 mass %, and furthermore preferably 2-20 mass % based on the total amount of the ink. If it is less than 0.5 mass %, storage stability of emulsion may be lowered. Also, if it is more than 40 mass %, viscosity may become too high to be suitable for inkjet. In addition, the amount of the emulsifier to be used is preferably 5-70 mass % and more preferably 10-60 mass % relative to the amount of the oil phase.

The oil phase can be prepared, for example, by putting the components in a known dispersing machine such as a beads-mill wholly or bit by bit to obtain a dispersion and if necessary passing it through a known filtering machine such as a membrane filter. For example, it can be prepared by obtaining a mixture of a part of the solvent and the whole of the pigment and pigment dispersing agent and uniformly dispersing them in a dispersing machine, and then adding the rest of the components to the dispersion followed by filtering.

The water phase is composed of water in which a water-soluble dye, a metal salt, an electrolyte, a moisturizing agent, a water-soluble polymer, an oil-in-water (O/W) emulsion of resin, a fungicide, an antiseptic, a pH controller, a freeze preventing agent or the like, may be dissolved if necessary.

As the water-soluble dye, anionic dyes such as azo, anthraquinone and azine based dyes can be used. Here, the anionic dye is a generic term of one in which a dye ion shows anionic property.

The amount to be blended of the water soluble dye is preferably 0-30 mass % and more preferably 10-24 mass % relative to the mass of the water phase. In the second aspect of the present invention, it is preferably 5-30 mass % and more preferably 10-24 mass % relative to the mass of the water phase. When the concentration of the water soluble dye is less than 5 mass %, viscosity may be increased. Also, when it is more than 30 mass %, ejection performance may be deteriorated. According to the present invention, storage stability at high temperature can be improved by allowing the dye to be contained in the water phase whilst allowing the pigment to be contained in the oil phase.

When the water soluble dye is used and dissolved in an inner water phase, the inner water phase preferably has a particle diameter of 80-500 nm. When it is smaller than 80 nm, printing density on the surface of prints may be lowered, or coloring of the dye may be deteriorated. When it is larger than 500 nm, inkjet ejection performance may be deteriorated.

When the water phase contains a water-soluble dye, a solubilizer for the water soluble dye can be added to the water phase. In this case, the dye which is dissolved at the molecular level permeates into and is adsorbed by paper fibers so that the coloring of the dye is improved. As the solubilizer, amine based surfactants are preferable. Examples of the amine based surfactant includes polyalkylene oxide adducts of organic amines such as ethylene oxides (EO) or propylene oxides (PO) adducts of alkyl amines, alkenyl amines, alkyl hydroxyl amines, alkenyl hydroxyl amines, oxyalkylamines, oxyalkenylamines or the like. Of these, ethylene oxides (EO) or propylene oxides (PO) adducts of alkyl amines are preferable. As such amine based surfactants, commercially available ones such as SOLSPERSE 20000, SOLSPERSE 27000, SOLSPERSE 46000 (all trade names) available from Lubrizol Japan Ltd., and TAMNO-15 (trade name) available from Nikko Chemical Corporation can be used. The amount to be blended of the solubilizer is preferably 0.1-10 mass % and more preferably 0.3-8 mass % relative to the total amount of the ink.

In order to lower the viscosity of the ink and thereby improve ejection performance, glycerol or diglycerol is preferably added to the water phase. The amount to be blended of glycerol or diglycerol is preferably 5-50 mass % and more preferably 5-40 mass % relative to the total amount of the water phase. When it is less than 5 mass %, the effect of lowering viscosity is difficult to obtain, and when it is more than 50 mass %, ejection stability or storage stability may be deteriorated.

The production method of the water-in-oil (W/O) emulsion ink for inkjet according to the present invention is not specifically limited. Examples include a method in which an emulsifier is dissolved in a pigment dispersion, followed by the addition of a water phase for emulsification, and a method in which a pigment dispersion and the water-in-oil (W/O) emulsion ink are previously prepared separately, and then these are mixed together. A known emulsifying machine such as a disper mixer, a homomixer and the like can be used for the preparation.

The ink for inkjet according to the present invention comprises 50 to 95 mass % of an oil phase and 50 to 5 mass % of a water phase. A water-in-oil (W/O) emulsion is difficult to be formed if the percentage of the water phase exceeds 50 mass %. If the percentage of the water phase is less than 5 mass %, printing density may lower or strike through may occur in prints. Generally, there is a tendency that the higher the percentage of the water phase is, the higher the viscosity of the ink becomes. Thus, a blending percentage of the two phases is preferably 60 to 95 mass % of the oil phase and 40 to 5 mass % of the water phase.

The viscosity of the thus-obtained present water-in-oil (W/O) emulsion ink for inkjet at 23° C. is preferably set within the range from 5 to 100 mPa·s, more preferably within the range from 5 to 50 mPa·s, and particularly preferably within the range from 10 to 20 mPa·s. The viscosity of the ink can be adjusted by controlling kinds and amounts of the components of the oil phase and amounts or contents of the water phase. Generally, there is a tendency that the lesser the amount of the water phase and/or emulsifier is, the lower the viscosity of the ink is, but also the lower the storage stability of emulsion is.

EXAMPLE

Hereinafter, the present invention will be described in detail by way of examples, however, the present invention is not limited to these examples.

Examples I-1 to I-48 and Comparative Examples I-1 to I-16

The pigment and dispersing agent in the amounts shown in Table 1 to Table 8 were mixed with a part of the solvent shown in the respective Tables, and the pigment was dispersed with a rocking mill (manufactured by Seiwa Giken Co., Ltd.) to obtain a pigment dispersion. Next, a water phase shown in Table 1 to Table 8 was obtained. Also, a surfactant was dissolved in a part of the remaining solvent so as to have a predetermined concentration, to obtain an oil phase. A water-in-oil (W/O) emulsion was prepared by dropping the previously-obtained water phase into the oil phase under stirring at 5000 rpm using a high speed homogenizer "Physcotron" (trade name; manufactured by MICROTEC CO., LTD.), and then continuing the stirring for 5 minutes at 20000 rpm. Further, the previously-obtained pigment dispersion was diluted with the remaining solvent and mixed with the above-prepared water-in-oil (W/O) emulsion to obtain a water-in-oil (W/O) emulsion ink. Meanwhile, the blending amount of each component shown in Table 1 to Table 8 is shown in parts by mass.

The respective inkjet inks obtained in the above Examples and Comparative Examples were evaluated by the following methods. The evaluation results of these are shown in Tables 1-8.

(I-1) Ejection Performance

Evaluation was made by printing sheets of plain paper "RISO-YOSHI, Usukuchi" (trade name; manufactured by RISO KAGAKU CORPORATION) using a line-head type inkjet printer "ORPHIS HC5500" (trade name; manufactured by RISO KAGAKU CORPORATION). Misfiring of ink was observed after solid image was printed continuously on ten sheets of paper, and evaluated according to the following standards.

A: Little misfire was observed so that almost the same image was printed on the first sheet and the tenth sheet.

B: Many misfires were observed so that the same image was not printed on the first sheet and the tenth sheet.

C: Ejection was impossible or too many misfires were observed so that solid image was difficult to print.

(I-2) Storage Stability (70° C., 2 Months)

The water-in-oil (W/O) emulsion ink causes separation of the water phase internally over time, so that the moisture content in the upper portion of the ink decreases. The moisture content in the upper portion of the ink was measured after the ink was stored at high temperature, and was compared with the moisture content before the storage so as to evaluate the degree of the separation of the water phase. A water-in-oil (W/O) emulsion ink was placed in a 10 ml screw vial, left for 2 months in a thermostatic chamber at 70° C., and then the moisture content in the upper portion of the ink was measured. The ink was sampled from the upper portion of the vial, and the moisture content was measured using Karl Fischer moisture titrator (701 type, manufactured by Metrohm-Shibata Ltd.).

$$\text{Residual ratio of moisture in the upper poriton of ink (\%)} = \frac{\text{Moisture content in the upper portion of ink after storage (mass \%)}}{\text{Moisture content in the upper portion of ink before storage (mass \%)}} \times 100$$

Storage stability was evaluated according to the following standards using the above-shown residual ratio of moisture as an indicator.

A: Residual ratio of moisture in the upper portion of ink is not less than 90%.

B: Residual ratio of moisture in the upper portion of ink is not less than 70% and less than 90%.

C: Residual ratio of moisture in the upper portion of ink is less than 70%.

TABLE 1

| Composition of ink | | | Emulsion property | | | | | | Example | | | | | | | | | | | | | | | |
|---|---|---|---|---|---|---|---|---|---|---|---|---|---|---|---|---|---|---|---|---|---|---|---|---|
| | | | Organic value | Inorganic value | HLB value | Fatty acid moiety | Polymerization degree of Glycerol | Degree of esterification | I-1 | I-2 | I-3 | I-4 | I-5 | I-6 | I-7 | I-8 | I-9 | I-10 | I-11 | I-12 | I-13 | I-14 | I-15 | I-16 | I-17 | I-18 | I-19 |
| Oil phase | Emulsifier (A) | Decaglyceryl diisostearate | 1300 | 1300 | 10.0 | Isostearic acid | 10 | 2 | 9.0 | 9.0 | 9.0 | 9.0 | | | | 7.0 | 5.0 | 18.0 | 2.3 | 9.0 | 9.0 | 18.0 | 2.3 | 9.0 | 18.0 | 2.3 | 9.0 |
| | | Tetraglyceryl monoisostearate | 590 | 620 | 10.5 | Isostearic acid | 4 | 1 | | | | | 9.0 | | | | | | | | | | | | | | |
| | | Hexaglyceryl monooleate | 720 | 862 | 12.0 | Oleic acid | 6 | 1 | | | | | | 9.0 | | | | | | | | | | | | | |
| | | Decaglyceryl trioleate | 1680 | 1266 | 7.5 | Oleic acid | 10 | 3 | | | | | | | 9.0 | | | | | | | | | | | | |
| | Emulsifier (B-a) | Glyceryl monoisostearate | 410 | 260 | 6.3 | Isostearic acid | 1 | 1 | 1.0 | | | | | | | | | | | | | | | | | |
| | | Diglyceryl monoisostearate | 470 | 380 | 8.1 | Isostearic acid | 2 | 1 | | 1.0 | | | | | | 3.0 | 5.0 | 2.0 | 0.3 | | | | | | | | |
| | | Diglyceryl diisostearate | 820 | 340 | 4.1 | Isostearic acid | 2 | 2 | | | 1.0 | | 1.0 | 1.0 | 1.0 | | | | | | | | | | | | |
| | | Diglyceryl triisostearate | 1170 | 300 | 2.6 | Isostearic acid | 2 | 3 | | | | 1.0 | | | | | | | | | | | | | | | |
| | | Sorbitan monoiso- | 470 | 435 | 9.3 | Isostearic acid | — | 1 | | | | | | | | | | | | 1.0 | | | | | | | |

TABLE 1-continued

| | | | | | | | | | | | Example | | | | | | | | | | |
|---|---|---|---|---|---|---|---|---|---|---|---|---|---|---|---|---|---|---|---|---|---|
| | | Emulsion property | | | | | I-1 | I-2 | I-3 | I-4 | I-5 | I-6 | I-7 | I-8 | I-9 | I-10 | I-11 | I-12 | I-13 | I-14 | I-15 | I-16 | I-17 | I-18 | I-19 |
| | Organic value | Inorganic value | HLB value | Fatty acid moiety | Polymerization degree of Glycerol | Degree of esterification | | | | | | | | | | | | | | | | | | | |
| stearate Sorbitan sesqui-isostearate | 645 | 375 | 5.8 | Isostearic acid | — | 1.5 | | | | | | | | | | | | | 1.0 | 2.0 | 0.3 | | | | |
| Pentaerythritol monostearate | 460 | 380 | 8.3 | Stearic acid | — | 1 | | | | | | | | | | | | | | | | 1.0 | 2.0 | 0.3 | |
| Pentaerythritol monooleate | 460 | 382 | 8.3 | Oleic acid | — | 1 | | | | | | | | | | | | | | | | | | | 1.0 |
| Pigment | Carbon black MA8 | | | | | | 10.0 | 10.0 | 10.0 | 10.0 | 10.0 | 10.0 | 10.0 | 10.0 | 10.0 | 5.0 | 10.0 | 10.0 | 10.0 | 5.0 | 10.0 | 10.0 | 5.0 | 10.0 | 10.0 |
| Dispersing agent | SOLSPERSE 28000 | | | | | | 3.3 | 3.3 | 3.3 | 3.3 | 3.3 | 3.3 | 3.3 | 3.3 | 3.3 | 1.7 | 3.3 | 3.3 | 3.3 | 1.7 | 3.3 | 3.3 | 1.7 | 3.3 | 3.3 |
| Organic solvent | AF SOLVENT No. 6 | | | | | | 56.7 | 46.7 | 26.7 | 46.7 | 56.7 | 56.7 | 56.7 | 56.7 | 56.7 | 33.3 | 79.2 | 56.7 | 56.7 | 33.3 | 79.2 | 56.7 | 33.3 | 79.2 | 56.7 |
| | Methyl oleate | | | | | | | 10.0 | 30.0 | 5.0 | | | | | | | | | | | | | | | |
| | Dodecan | | | | | | | | 20.0 | 5.0 | | | | | | | | | | | | | | | |
| Water phase | Ion exchanged water | | | | | | 20.0 | 20.0 | 20.0 | 20.0 | 20.0 | 20.0 | 20.0 | 20.0 | 20.0 | 40.0 | 5.0 | 20.0 | 20.0 | 40.0 | 5.0 | 20.0 | 40.0 | 5.0 | 20.0 |
| Evaluation | Total (part) | | | | | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| | Ejection performance | | | | | | A | A | A | A | A | A | A | A | A | B | B | B | A | B | A | A | B | A | A |
| | Storage stability (70° C., 2 months) | | | | | | B | B | B | B | B | B | B | B | B | B | B | B | A | A | A | A | A | A | B |

TABLE 2

| | | | | Emulsion property | | | | | | | | | | | |
|---|---|---|---|---|---|---|---|---|---|---|---|---|---|---|---|
| | | | | Organic value | Inorganic value | HLB | Fatty acid moiety | Polymerization degree of Glycerol | Degree of esterification | colspan="7" | Comparative Example |
| | | | | | | | | | | I-1 | I-2 | I-3 | I-4 | I-5 | I-6 | I-7 |
| Composition of ink | Oil phase | Emulsifier (A) | Decaglyceryl diisostearate | 1300 | 1300 | 10.0 | Isostearic acid | 10 | 2 | 10.0 | 9.0 | | | | | |
| | | | Tetraglyceryl monoisosterate | 590 | 620 | 10.5 | Isostearic acid | 4 | 1 | | | 1.0 | 9.0 | | | |
| | | Emulsifier (B-a) | Glyceryl monoisostearate | 410 | 260 | 6.3 | Isostearic acid | 1 | 1 | | | | | 10.0 | | |
| | | | Diglyceryl monoisostearate | 470 | 380 | 8.1 | Isostearic acid | 2 | 1 | | | | | | 9.0 | |
| | | | Sorbitan monoisostearate | 470 | 435 | 9.3 | Isostearic acid | — | 1 | | | | | 9.0 | | |
| | | | Sorbitan sesquiisostearate | 645 | 375 | 5.8 | Isostearic acid | — | 1.5 | | | | | 1.0 | | |
| | | | Pentaerythritol monostearate | 460 | 380 | 8.3 | Stearic acid | — | 1 | | | | | | | |
| | | | Pentaerythritol monooleate | 460 | 382 | 8.3 | Oleic acid | — | 1 | | | | | | | |
| | | Emulsifier (C) | Hexaglyceryl monolaurate | 600 | 860 | 14.3 | Lauric acid | 6 | 1 | | | | 1.0 | | | 1.0 |
| | | | Decaglyceryl decaisostearate | 4100 | 980 | 2.4 | Isostearic acid | 10 | 10 | | | | | | 1.0 | 9.0 |
| | | Pigment | Carbon black MA8 | | | | | | | 10.0 | 10.0 | 10.0 | 10.0 | 10.0 | 10.0 | 10.0 |
| | | Dispersing agent | SOLSPERSE 28000 | | | | | | | 3.3 | 3.3 | 3.3 | 3.3 | 3.3 | 3.3 | 3.3 |
| | | Organic solvent | AF SOLVENT No. 6 Methyl oleate Dodecan | | | | | | | 56.7 | 56.7 | 56.7 | 56.7 | 56.7 | 56.7 | 56.7 |
| | Water Phase | Water | Ion exchanged water | | | | | | | 20.0 | 20.0 | 20.0 | 20.0 | 20.0 | 20.0 | 20.0 |
| | | | Total (part) | | | | | | | 100.0 | 100.0 | 100.0 | 100.0 | 100.0 | 100.0 | 100.0 |
| | Evaluation | | Ejection performance | | | | | | | A | A | A | B | B | B | C |
| | | | Storage stability (70° C., 2 months) | | | | | | | C | C | C | C | C | C | C |

TABLE 3

| Composition of ink | | | | Emulsion property | | | | | Example | | | | | | | | | | | | |
|---|---|---|---|---|---|---|---|---|---|---|---|---|---|---|---|---|---|---|---|---|---|
| | | | | | | | Fatty acid moiety or alkyl chain | Polymerization degree of Glycerol | Degree of esterification | I-20 | I-21 | I-22 | I-23 | I-24 | I-25 | I-26 | I-27 | I-28 | I-29 | I-30 | I-31 |
| | | | | Organic value | Inorganic value | HLB | | | | | | | | | | | | | | | |
| Oil phase | Emulsifier (A) | Decaglyceryl diisostearate | | 1300 | 1300 | 10.0 | Isostearic acid | 10 | 2 | 9.0 | | | | | | | | | | | |
| | | Tetraglyceryl monoisostearate | | 590 | 620 | 10.5 | Isostearic acid | 4 | 1 | | 2.3 | | | | | | | | | | |
| | | Hexaglyceryl monooleate | | 720 | 862 | 12.0 | Oleic acid | 6 | 1 | | | 18.0 | | | | | | | | | |
| | | Decaglyceryl trioleate | | 1680 | 1266 | 7.5 | Oleic acid | 10 | 3 | | | | 9.0 | | | | | | | | |
| | Emulsifier (B-b) | Monoisostearyl glyceryl ether | | 410 | 220 | 5.4 | Isostearyl | — | — | 1.0 | 0.3 | 2.0 | 1.0 | 3.0 | 5.0 | 0.8 | 0.5 | 0.3 | | | |
| | | Monooleyl glyceryl ether | | 420 | 222 | 5.2 | Oleyl | — | — | | | | | | | | | | 1.0 | | |
| | | Monocetyl glyceryl ether | | 380 | 220 | 5.8 | Hexadecyl | — | — | | | | | | | | | | | 1.0 | |
| | | Monostearyl glyceryl ether | | 420 | 220 | 5.3 | Stearyl | — | — | | | | | | | | | | | | 1.0 |
| | Pigment | Carbon black MA8 | | | | | | | | 10.0 | 10.0 | 5.0 | 10.0 | 10.0 | 10.0 | 10.0 | 10.0 | 10.0 | 10.0 | 10.0 | 10.0 |
| | Dispersing agent | SOLSPERSE 28000 | | | | | | | | 3.3 | 3.3 | 1.7 | 3.3 | 3.3 | 3.3 | 3.3 | 3.3 | 3.3 | 3.3 | 3.3 | 3.3 |
| | Organic solvent | AF SOLVENT No. 6 | | | | | | | | 56.7 | 79.2 | 33.3 | 46.7 | 56.7 | 56.7 | 59.2 | 61.7 | 64.2 | 56.7 | 56.7 | 56.7 |
| | | Methyl oleate | | | | | | | | | | | 5.0 | | | | | | | | |
| | | Dodecan | | | | | | | | | | | 5.0 | | | | | | | | |
| Water Phase | Water | Ion exchanged water | | | | | | | | 20.0 | 5.0 | 40.0 | 20.0 | 20.0 | 20.0 | 20.0 | 20.0 | 20.0 | 20.0 | 20.0 | 20.0 |
| | | Total (part) | | | | | | | | 100.0 | 100.0 | 100.0 | 100.0 | 100.0 | 100.0 | 100.0 | 100.0 | 100.0 | 100.0 | 100.0 | 100.0 |
| Evaluation | | Ejection performance | | | | | | | | A | A | B | A | A | A | A | A | A | A | A | A |
| | | Storage stability (70° C., 2 months) | | | | | | | | A | A | A | A | A | A | A | A | A | A | A | A |

TABLE 4

| | | | | Organic value | Inorganic value | HLB | Fatty acid moiety or alkyl chain | Polymerization degree of Glycerol | Degree of esterification | Comparative Example | | |
|---|---|---|---|---|---|---|---|---|---|---|---|---|
| | | | | | | | | | | I-8 | I-9 | I-10 |
| Composition of ink | Oil phase | Emulsifier (A) | Decaglyceryl diisostearate | 1300 | 1300 | 10.0 | Isostearic acid | 10 | 2 | | | |
| | | | Tetraglyceryl monoisostearate | 590 | 620 | 10.5 | Isostearic acid | 4 | 1 | | | |
| | | Emulsifier (B-b) | Monoisostearyl glyceryl ether | 410 | 220 | 5.4 | Isostearyl | — | — | | | 1.0 |
| | | | Monooleyl glyceryl ether | 420 | 222 | 5.2 | Oleyl | — | — | | 9.0 | |
| | | | Monocetyl glyceryl ether | 380 | 220 | 5.8 | Hexadecyl | — | — | 10.0 | | |
| | | | Monostearyl glyceryl ether | 420 | 220 | 5.3 | Stearyl | — | — | | 1.0 | |
| | | Emulsifier (C) | Hexaglyceryl monolaurate | 600 | 860 | 14.3 | Lauric acid | 6 | 1 | | | 9.0 |
| | | | Decaglyceryl decaisostearate | 4100 | 980 | 2.4 | Isostearic acid | 10 | 10 | | | |
| | | Pigment | | | | | Carbon black MA8 | | | 10.0 | 10.0 | 10.0 |
| | | Dispersing agent | | | | | SOLSPERSE 28000 | | | 3.3 | 3.3 | 3.3 |
| | | Organic solvent | | | | | AF SOLVENT No. 6 Methyl oleate Dodecan | | | 56.7 | 56.7 | 56.7 |
| | Water Phase | Water | | | | | Ion exchanged water | | | 20.0 | 20.0 | 20.0 |
| | | | Total (part) | | | | | | | 100.0 | 100.0 | 100.0 |
| | Evaluation | | | | | | Ejection performance | | | C | C | B |
| | | | | | | | Storage stability (70° C., 2 months) | | | C | C | C |

TABLE 5

| Composition of ink | | | Organic value | Inorganic value | Emulsion property | | | | Example | | | | | | | | | |
|---|---|---|---|---|---|---|---|---|---|---|---|---|---|---|---|---|---|---|
| | | | | | HLB | Fatty acid moiety or alkyl chain | Polymerization degree of Glycerol | Degree of esterification | I-32 | I-33 | I-34 | I-35 | I-36 | I-37 | I-38 | I-39 | I-40 | I-41 |
| Oil phase | Emulsifier (A) | Decaglyceryl diisostearate | 1300 | 1300 | 10.0 | Isostearic acid | 10 | 2 | 9.0 | | | | 7.0 | 5.0 | 4.5 | 2.3 | 9.0 | 9.0 |
| | | Tetraglyceryl monoisostearate | 590 | 620 | 10.5 | Isostearic acid | 4 | 1 | | 18.0 | | | | | | | | |
| | | Hexaglyceryl monooleate | 720 | 862 | 12.0 | Oleic acid | 6 | 1 | | | 9.0 | | | | | | | |
| | | Decaglyceryl trioleate | 1680 | 1266 | 7.5 | Oleic acid | 10 | 3 | | | | 9.0 | | | | | | |
| | Emulsifier (B-c) | Phytantriol | 360 | 300 | 8.3 | Diterpene | — | — | 1.0 | 2.0 | 1.0 | 1.0 | 3.0 | 5.0 | 0.5 | 0.3 | | |
| | | Phytol | 360 | 102 | 2.8 | Diterpene | — | — | | | | | | | | | 1.0 | |
| | | Isophytol | 360 | 102 | 2.8 | Diterpene | — | — | | | | | | | | | | 1.0 |
| | Pigment | Carbon black MA8 | | | | | | | 10.0 | 5.0 | 10.0 | 10.0 | 10.0 | 10.0 | 10.0 | 10.0 | 10.0 | 10.0 |
| | Dispersing agent | SOLSPERSE 28000 | | | | | | | 3.3 | 1.7 | 3.3 | 3.3 | 3.3 | 3.3 | 3.3 | 3.3 | 3.3 | 3.3 |
| | Organic solvent | AF SOLVENT No. 6 | | | | | | | 56.7 | 33.3 | 46.7 | 36.7 | 56.7 | 71.7 | 61.7 | 64.2 | 56.7 | 56.7 |
| | | Methyl oleate | | | | | | | | | 10.0 | | | | | | | |
| | | Dodecan | | | | | | | | | | 20.0 | | | | | | |
| Water Phase | Water | Ion exchanged water | | | | | | | 20.0 | 40.0 | 20.0 | 20.0 | 20.0 | 5.0 | 20.0 | 20.0 | 20.0 | 20.0 |
| | | Total (part) | | | | | | | 100.0 | 100.0 | 100.0 | 100.0 | 100.0 | 100.0 | 100.0 | 100.0 | 100.0 | 100.0 |
| Evaluation | | Ejection performance | | | | | | | A | B | A | A | A | A | A | A | A | A |
| | | Storage stability (70° C., 2 months) | | | | | | | B | B | B | B | B | B | B | B | B | B |

TABLE 6

| | | | | Emulsion property | | | | | Comparative example | | |
|---|---|---|---|---|---|---|---|---|---|---|---|
| | | | | Organic value | Inorganic value | HLB | Fatty acid moiety or alkyl chain | Polymerization degree of Glycerol | Degree of esterification | I-11 | I-12 | I-13 |
| Composition of ink | Oil phase | Emulsifier (A) | Decaglyceryl diisostearate | 1300 | 1300 | 10.0 | Isostearic acid | 10 | 2 | | | |
| | | | Tetraglyceryl monoisostearate | 590 | 620 | 10.5 | Isostearic acid | 4 | 1 | | | |
| | | Emulsifier (B-c) | Phytantriol | 360 | 300 | 8.3 | Diterpene | — | — | 10.0 | 9.0 | |
| | | | Isophytol | 360 | 102 | 2.8 | Diterpene | — | — | | | 1.0 |
| | | | Phytol | 360 | 102 | 2.8 | Diterpene | — | — | | 1.0 | |
| | | Emulsifier (C) | Hexaglyceryl monolaurate | 600 | 860 | 14.3 | Lauric acid | 6 | 1 | | | |
| | | | Decaglyceryl decaisostearate | 4100 | 980 | 2.4 | Isostearic acid | 10 | 10 | | | 9.0 |
| | | Pigment | | | | | Carbon black MA8 | | | 10.0 | 10.0 | 10.0 |
| | | Dispersing agent | | | | | SOLSPERSE 28000 | | | 3.3 | 3.3 | 3.3 |
| | | Organic solvent | | | | | AF SOLVENT No. 6 | | | 56.7 | 56.7 | 56.7 |
| | | | | | | | Methyl Oleate | | | | | |
| | | | | | | | Dodecan | | | | | |
| | Water Phase | Water | | | | | Ion exchanged water | | | 20.0 | 20.0 | 20.0 |
| | | | | | | Total (part) | | | | 100.0 | 100.0 | 100.0 |
| Evaluation | | | | | | Ejection performance | | | | C | C | B |
| | | | | | | Storage stability (70° C., 2 months) | | | | C | C | C |

TABLE 7

| | | | | Emulsion property | | | | | | Example | | | | | | |
|---|---|---|---|---|---|---|---|---|---|---|---|---|---|---|---|---|
| | | | | Organic value | Inorganic value | HLB | Fatty acid moiety | Polymerization degree of Glycerol | Degree of esterification | I-42 | I-43 | I-44 | I-45 | I-46 | I-47 | I-48 |
| Composition of ink | Oil phase | Emulsifier (A) | Decaglyceryl diisostearate | 1300 | 1300 | 10.0 | Isostearic acid | 10 | 2 | 9.0 | | | | 9.0 | | 9.0 |
| | | | Tetraglyceryl monoisostearate | 590 | 620 | 10.5 | Isostearic acid | 4 | 1 | | 9.0 | | | | 9.0 | |
| | | | Hexaglyceryl monooleate | 720 | 862 | 12.0 | Oleic acid | 6 | 1 | | | 9.0 | | | | |
| | | | Decaglyceryl trioleate | 1680 | 1266 | 7.5 | Oleic acid | 10 | 3 | | | | 9.0 | | | |
| | | Emulsifier (B-d) | Sucrose stearate | | | 1.0 | | | | | 1.0 | | | | | |
| | | | Sucrose stearate | | | 3.0 | | | | | | | 1.0 | | | |
| | | | Sucrose stearate | | | 5.0 | | | | | | | | 1.0 | | |
| | | | Sucrose stearate | | | 9.0 | | | | | | | | | 1.0 | 3.0 |
| | | | Sucrose stearate | | | 11.0 | | | | | | | | | | 1.0 | 0.5 |
| | | | Sucrose stearate | | | 15.0 | | | | | | | | | | | 0.5 |
| | | Pigment | | | | | Carbon black MA8 | | | 10.0 | 10.0 | 10.0 | 10.0 | 10.0 | 10.0 | 10.0 |
| | | Dispersing agent | | | | | SOLSPERSE 28000 | | | 3.3 | 3.3 | 3.3 | 3.3 | 3.3 | 3.3 | 3.3 |
| | | Organic solvent | | | | | AF SOLVENT No. 6 | | | 56.7 | 46.7 | 56.7 | 46.7 | 54.7 | 56.7 | 56.7 |
| | | | | | | | Methyl oleate | | | | 10.0 | | 5.0 | | | |
| | | | | | | | Dodecan | | | | | | 5.0 | | | |
| | Water Phase | Water | | | | | Ion exchanged water | | | 20.0 | 20.0 | 20.0 | 20.0 | 20.0 | 20.0 | 20.0 |
| | | | | | | Total (part) | | | | 100.0 | 100.0 | 100.0 | 100.0 | 100.0 | 100.0 | 100.0 |
| Evaluation | | | | | | Ejection performance | | | | A | A | A | A | A | A | A |
| | | | | | | Storage stability (70° C., 2 months) | | | | B | A | B | B | B | A | B |

TABLE 8

| | | | | Organic value | Inorganic value | HLB | Fatty acid moiety | Polymerization degree of Glycerin | Degree of esterification | Comparative example | | |
|---|---|---|---|---|---|---|---|---|---|---|---|---|
| | | | | | | | | | | I-14 | I-15 | I-16 |
| Composition of ink | Oil phase | Emulsifier (A) | Decaglyceryl diisostearate | 1300 | 1300 | 10.0 | Isostearic acid | 10 | 2 | | | |
| | | | Tetraglyceryl monoisostearate | 590 | 620 | 10.5 | Isostearic acid | 4 | 1 | 9.0 | | |
| | | Emulsifier (B-d) | Sucrose stearate | | | 9.0 | | | | | 1.0 | 10.0 |
| | | | Sucrose stearate | | | 15.0 | | | | | 1.0 | |
| | | Emulsifier (C) | Hexaglyceryl monolaurate | 600 | 860 | 14.3 | Lauric acid | 6 | 1 | | 9.0 | |
| | | | Decaglyceryl decaisostearate | 4100 | 980 | 2.4 | Isostearic acid | 10 | 10 | | | |
| | | Pigment | | | | | Carbon black MA8 | | | 10.0 | 10.0 | 10.0 |
| | | Dispersing agent | | | | | SOLSPERSE 28000 | | | 3.3 | 3.3 | 3.3 |
| | | Organic solvent | | | | | AF SOLVENT No. 6 | | | 56.7 | 56.7 | 56.7 |
| | | | | | | | Methyl oleate | | | | | |
| | | | | | | | Dodecan | | | | | |
| | Water Phase | Water | | | | | Ion exchanged water | | | 20.0 | 20.0 | 20.0 |
| | | | Total (part) | | | | | | | 100.0 | 100.0 | 100.0 |
| Evaluation | | | | | | | Ejection performance | | | A | C | C |
| | | | | | | | Storage stability (70° C., 2 months) | | | C | C | B |

Details of raw materials shown in Tables 1-8 are as follows:
Decaglyceryl diisosterate: Decaglyn2-ISV (trade name) available from Nikko Chemical Corporation.
Tetraglyceryl monoisostearate: IS401P (trade name) available from Sakamoto Yakuhin Kogyo Co., Ltd.
Hexaglyceryl monooleate: Hexaglyn1-OV (trade name) available from Nikko Chemical Corporation.
Decaglyceryl trioleate: Decaglyn3-OV (trade name) available from Nikko Chemical Corporation.
Glyceryl monoisostearate: MGIS (trade name) available from Nikko Chemical Corporation.
Diglyceryl monoisostearate: DGMIS (trade name) available from Nikko Chemical Corporation.
Diglyceryl diisostearate: Risorex PGIS22 (trade name) available from KOKYU ALCOHOL KOGYO CO., LTD.
Diglyceryl triisostearate: DGTIS (trade name) available from Nikko Chemical Corporation.
Hexaglyceryl monolaurate: Hexaglyn 1-L (trade name) available from Nikko Chemical Corporation.
Decaglyceryl decaisostearate: Decaglyn 10-ISV (trade name) available from Nikko Chemical Corporation.
Sorbitan monoisostearate: SI-10RV (trade name) available from Nikko Chemical Corporation.
Sorbitan sesquiisostearate: SI-15RV (trade name) available from Nikko Chemical Corporation.
Pentaerythritol monostearate: EXEPARL PE-MO (trade name) available from Kao Corporation.
Pentaerythritol monooleate: EXEPARL PE-MS-P (trade name) available from Kao Corporation.
Sucrose stearate: RYOTO Sugar Ester S170, S370, S570, S970, S1170, S1570 (trade name) available from Mitsubishi-Kagaku Foods Corporation
Monoisostearyl glyceryl ether: PENETOL GE-IS (trade name) available from Kao Corporation.
Monooleyl glyceryl ether: Selachyl alcohol available from Nikko Chemical Corporation.
Monocetyl glyceryl ether: Chimyl alcohol available from Nikko Chemical Corporation.
Monostearyl glyceryl ether: Batyl alcohol available from Nikko Chemical Corporation.
Phytantriol: Phytantriol available from TOKYO CHEMICAL INDUSTRY CO., LTD.
Phytol: Phytol available from TOKYO CHEMICAL INDUSTRY CO., LTD.
Isophytol: Isophytol available from TOKYO CHEMICAL INDUSTRY CO., LTD.
Carbon black MA8: Carbon black MA8 (trade name) available from Mitsubishi Chemical Corporation.
SOLSPERSE 28000: Pigment dispersing agent SOLSPERSE 28000 (trade name) available from Lubrizol Japan Ltd.
AF SOLVENT No. 6 (trade name): Petroleum based hydrocarbon solvent available from JX Nippon Oil & Energy Corporation.
Methyl oleate: MOL (trade name) available from Nikko Chemical Corporation.
Dodecane: Dodecane available from Wako Pure Chemical Industries, Ltd.

As shown in the results of Table 1, storage stability was improved while inkjet ejection performance was maintained, when a polyglyceryl fatty acid ester (A) and a nonionic surfactant (B-a) comprising the specific esterification product both of which satisfy the requirements of the present invention were used as emulsifiers as in the inks of Examples I-1 to I-19 that contained a pigment in the oil phase. Also, as clear from Examples I-13 to I-18, storage stability was extremely superior when sorbitan sesquiisostearate and pentaerythritol monostearate were used as the nonionic surfactant.

In contrast, as shown in the results of Table 2, storage stability was deteriorated while ejection performance was good in Comparative Examples I-1 to I-3 in which the polyglyceryl fatty acid ester (A) satisfying the requirements of the present invention was used as an emulsifier alone or in combination with a polyglyceryl fatty acid ester which did not satisfy the requirements of the present invention, without use of the nonionic surfactant (B) satisfying the requirements of the present invention.

Also, storage stability was deteriorated while ejection performance was good (but was inferior to Comparative Examples I-1 to I-3) in Comparative Examples I-4 to I-6 in which the nonionic surfactant (B) satisfying the requirements of the present invention was used as an emulsifier alone or in combination with a polyglyceryl fatty acid ester which did not satisfy the requirements of the present invention, without use of the polyglyceryl fatty acid ester (A) satisfying the requirements of the present invention.

In addition, both ejection performance and storage stability were insufficient in Comparative Example I-7 in which two different polyglyceryl fatty acid esters which did not satisfy the requirements of the present invention were used as emulsifiers.

In addition, in the inks of Examples I-20 to I-31, as shown in the results of Table 3, storage stability was improved while ejection performance was maintained, when a polyglyceryl fatty acid ester (A) and a nonionic surfactant (alkyl glyceryl ether (B-b)) both of which satisfy the requirements of the present invention were used together as emulsifiers. Especially, storage stability was equivalent to the results of Examples I-13 to I-18, and extremely superior.

In contrast, as shown in the results of Table 4, ejection performance was insufficient and storage stability was deteriorated in Comparative Examples I-8 to I-10 in which the nonionic surfactant (alkyl glyceryl ether (B-b)) satisfying the requirements of the present invention was used alone or in combination with a polyglyceryl fatty acid ester which did not satisfy the requirements of the present invention, without use of the polyglyceryl fatty acid ester (A) satisfying the requirements of the present invention.

In addition, as shown in the results of Table 5, storage stability was improved while ejection performance was maintained in Examples I-32 to I-41 in which a polyglyceryl fatty acid ester (A) and a nonionic surfactant (diterpene alcohol (B-c)) both of which satisfy the requirements of the present invention were used together as emulsifiers.

In contrast, as shown in the results of Table 6, ejection performance was insufficient and storage stability was deteriorated in Comparative Examples I-11 to I-13 in which the diterpene alcohol (B-c) satisfying the requirements of the present invention was used alone or in combination with a polyglyceryl fatty acid ester which did not satisfy the requirements of the present invention, without use of the polyglyceryl fatty acid ester (A) satisfying the requirements of the present invention.

Further, as shown in the results of Table 7, storage stability was improved while ejection performance was maintained in Examples I-42 to I-48 in which a polyglyceryl fatty acid ester (A) and a nonionic surfactant (sucrose fatty acid ester (B-d)) both of which satisfy the requirements of the present invention were used together as emulsifiers.

In contrast, as shown in the results of Table 8, storage stability was deteriorated while ejection performance was good in Comparative Example I-14 in which a polyglyceryl fatty acid ester (A) which satisfied the requirements of the present invention was used in combination with a sucrose fatty acid ester which did not satisfying the requirements of the present invention as emulsifiers.

In addition, ejection performance was insufficient and storage stability was also deteriorated in Comparative Examples I-15 and I-16 in which a sucrose fatty acid ester (B-d) satisfying the requirements of the present invention was used alone or in combination with a polyglyceryl fatty acid ester which did not satisfy the requirements of the present invention, without use of the polyglyceryl fatty acid ester (A) satisfying the requirements of the present invention.

Examples II-1 to II-8 and Comparative Examples II-1 to II-5

The pigment and dispersing agent in the amounts shown in Table 9 were mixed with a part of the solvent shown in the respective Table, and the pigment was dispersed with a rocking mill (manufactured by Seiwa Giken Co., Ltd.) to obtain a pigment dispersion. Next, the water phase components shown in Table 9 were mixed to obtain a water phase. A surfactant was dissolved in a part of the remaining solvent so as to have a predetermined concentration, to obtain an oil phase. A water-in-oil (W/O) emulsion was prepared by dropping the previously-obtained water phase into the oil phase under stirring at 5000 rpm using a high speed homogenizer "Physcotron" (trade name; manufactured by MICROTEC CO., LTD.), and then continuing the stirring for 5 minutes at 20000 rpm. Further, the previously-obtained pigment dispersion was diluted with the remaining solvent and mixed with the above-prepared water-in-oil (W/O) emulsion to obtain a water-in-oil (W/O) emulsion ink. Meanwhile, the blending amount of each component shown in Table 9 is shown in parts by mass.

The respective inkjet inks obtained respectively in the above Examples and Comparative Examples were evaluated by the following methods.

(II-1) Change in Moisture Content (Degree of Water Phase Separation after 4 Weeks at 70° C.)

The water-in-oil (W/O) emulsion ink causes separation of the water phase internally over time, so that the moisture content in the upper portion of the ink decreases. The moisture content in the upper portion of the ink was measured after the ink was stored at high temperature, and was compared with the moisture content before the storage so as to evaluate the degree of the separation of the water phase. A water-in-oil (W/O) emulsion ink was placed in a 10 ml screw vial, left for 4 weeks in a thermostatic chamber at 70° C., and then the moisture content in the upper portion of the ink was measured. The ink was sampled from the upper portion of the vial, and the moisture content was measured using Karl Fischer moisture titrator (701 type, manufactured by Metrohm-Shibata Ltd.).

$$\text{Residual ratio of moisture in the upper portion of ink (\%)} = \frac{\text{Moisture content (mass \%) in the upper portion of ink after storage}}{\text{Moisture content (mass \%) in the upper portion of ink before storage}} \times 100$$

Storage stability was evaluated according to the following standards using the above-shown residual ratio of moisture as an indicator.

A: Residual ratio of moisture in the upper portion of ink is not less than 80%.

B: Residual ratio of moisture in the upper portion of ink is less than 80%.

(II-2) Change in Viscosity (mPa·s)

A water-in-oil (W/O) emulsion ink was placed in a 10 ml screw vial, left for 4 weeks in a thermostatic chamber at 70° C., and then a viscosity after the storage was measured and compared with one before the storage. A predetermined amount of ink was sampled from the upper portion of the ink, and Rheometer AR-G2 (available from TA Instruments) was used to measure the viscosity (unit: mPa·s) of the ink when 10 Pa shear stress was applied onto the ink. Meanwhile, ND in Tables means "not determined".

$$\text{Rate of change in viscosity (\%)} = \left[\left(\frac{\text{Ink viscosity (mPas) after storage for 4 weeks at 70° C.}}{\text{Ink viscosity (mPas) before storage}}\right) - 1\right] \times 100$$

Degree of viscosity change was evaluated using the above-shown rate of change in viscosity as an indicator.
S: Absolute value of rate of change in viscosity is less than 5%.
A: Absolute value of rate of change in viscosity is not less than 5% and less than 10%.
B: Absolute value of rate of change in viscosity is not less than 10% and less than 15%.
C: Absolute value of rate of change in viscosity is not less than 15%.

TABLE 9

| | | | | Example | | | | | | | | Comparative Example | | | | |
|---|---|---|---|---|---|---|---|---|---|---|---|---|---|---|---|---|
| | | | | II-1 | II-2 | II-3 | II-4 | II-5 | II-6 | II-7 | II-8 | II-1 | II-2 | II-3 | II-4 | II-5 |
| Oil phase | Emulsifier | Polyglyceryl fatty acid ester (A) | Decaglyceryl diisostearate | 10.0 | | 9.0 | 9.0 | 9.0 | 9.0 | 9.0 | 9.0 | 10.0 | 10.0 | | | |
| | | | Decaglyceryl trioleate | | 10.0 | | | | | | | | | | | |
| | | | Decaglyceryl monolaurate | | | | | | | | | | | 10.0 | | |
| | | | Decaglyceryl distearate | | | | | | | | | | | | 10.0 | |
| | | Alkylglyceryl ether (B-b) | Isostearyl glyceryl ether | | | 1.0 | | 1.0 | 1.0 | 1.0 | 1.0 | | | | | |
| | | | Cetyl glyceryl ether | | | | 1.0 | | | | | | | | | |
| | | Sorbitan fatty acid ester | Sorbitan sesquioleate | | | | | | | | | | | | | 10.0 |
| | Pigment | Carbon black | Carbon black MA-8 | 10.0 | 10.0 | 10.0 | 10.0 | 10.0 | 10.0 | 10.0 | 10.0 | 10.0 | | 10.0 | 10.0 | 10.0 |
| | Dispersing agent | | SOLSPERSE 28000 | 6.0 | 6.0 | 6.0 | 6.0 | 6.0 | 6.0 | 6.0 | 6.0 | 6.0 | | 6.0 | 6.0 | 6.0 |
| | Solvent | | AF SOLVENT No. 6 | 54.0 | 54.0 | 54.0 | 54.0 | 54.0 | 54.0 | 54.0 | 54.0 | 54.0 | 70.0 | 54.0 | 54.0 | 54.0 |
| Water Phase | Water soluble dye | | Food Black 2 (solid matter) | 3.0 | 3.0 | 3.0 | 3.0 | | 3.0 | 2.0 | 4.8 | | 3.0 | 3.0 | 3.0 | 3.0 |
| | | | Direct Blue 87 (solid matter) | | | | | 3.0 | | | | | | | | |
| | | | Glycerol | | | | | | 4.0 | 4.0 | 4.0 | | | | | |
| | | | Water | 17.0 | 17.0 | 17.0 | 17.0 | 17.0 | 13.0 | 14.0 | 11.2 | 20.0 | 17.0 | 17.0 | 17.0 | 17.0 |
| | Total (part) | | | 100.0 | 100.0 | 100.0 | 100.0 | 100.0 | 100.0 | 100.0 | 100.0 | 100.0 | 100.0 | 100.0 | 100.0 | 100.0 |
| | Concentration of water soluble dye in water phase | | | 15 | 15 | 15 | 15 | 15 | 15 | 10 | 24 | 0 | 15 | 15 | 15 | 15 |
| Evaluation | Storage stability (70° C., 4 weeks) | | Change in moisture content | A | A | A | A | A | A | A | A | A | B | B | B | B |
| | | | Change in viscosity | B | B | A | A | A | S | S | S | C | C | C | C | C |

Meanwhile, details of raw materials are shown in Table 10.

TABLE 10

| (a) Emulsifier | | | | | | | | |
|---|---|---|---|---|---|---|---|---|
| | | | Emulsion property | | | | | |
| | Product name | Manufacturer | Organic value | Inorganic value | HLB | Fatty acid moiety or alkyl chain | Polymerization degree of Glycerol | Degree of esterification |
| Decaglyceryl diisostearate | Decaglyn 2-ISV | Nikko Chemical Corporation | 1300 | 1300 | 10.0 | Isostearic acid | 10 | 2 |
| Decaglyceryl trioleate | Decaglyn 3-OV | Nikko Chemical Corporation | 1680 | 1266 | 7.5 | Oleic acid | 10 | 3 |
| Decaglyceryl monolaurate | Decaglyn 1-L | Nikko Chemical Corporation | 600 | 860 | 14.3 | Lauric acid | 10 | 1 |
| Decaglyceryl distearate | Decaglyn 2-SV | Nikko Chemical Corporation | 1320 | 1300 | 9.8 | Stearic acid | 10 | 2 |
| Isostearyl glyceryl ether | PENETOL GE-IS | Kao Corporation | 410 | 220 | 5.4 | Isostearyl | — | — |
| Cetyl glyceryl ether | Chimyl alcohol | Nikko Chemical Corporation | 380 | 220 | 5.8 | Hexadecyl | — | — |

TABLE 10-continued

| Sorbitan sesquioleate | SO-15V | Nikko Chemical Corporation | — | — | — | — | — | — |

(b) Coloring agent and others

| | Product name | Manufacturer |
|---|---|---|
| Carbon black MA-8 | MA-8 | Mitsubishi Chemical Corporation |
| SOLSPERSE 28000 | SOLSPERSE 28000 | Lubrizol Japan Ltd. |
| AF SOLVENT NO. 6 | AF SOLVENT No. 6 | JX Nippon Oil & Energy Corporation |
| Food Black 2 (solid matter) | KST Black J-BL | NIPPON KAYAKU Co., Ltd. |
| Direct Blue 87 (solid matter) | Water Blue 3 | ORIENT CHEMICAL INDUSTRIES Co., Ltd. |
| Glycerol | Glycerol | Wako Pure Chemical Industries, ltd |

The evaluation results are shown in Table 9.

It has been found that the change in moisture content and the change in viscosity between before and after storage were decreased, and storage stability at high temperature was improved in the inks of Examples II-1 to II-8 in which a polyglyceryl fatty acid ester (A) satisfying the requirements of the present invention was used as an emulsifier, and a pigment was dispersed in the oil phase whilst a water soluble dye was dissolved in the water phase. In addition, as in Examples II-6 to II-8, it has been found that when glycerol or diglycerol was added to the water phase, the change in viscosity of the ink between before and after storage was decreased.

In contrast, in Comparative Example II-1 in which a pigment was contained in the oil phase but no water soluble dye was contained in the water phase, the change in moisture content between before and after storage of the ink was decreased, but the change in viscosity was great so that storage stability was inferior. In addition, in Comparative Example II-2 in which a water soluble dye was contained in the water phase but no pigment was contained in the oil phase, the change in moisture content between before and after storage of the ink was increased and the viscosity was also lowered, and thus storage stability was inferior.

In addition, in Comparative Examples II-3 to II-5 in which an emulsifier which does not satisfy the requirements of the present invention was used, the change in moisture content and the change in viscosity between before and after storage of the ink were great, and thus storage stability was inferior.

INDUSTRIAL APPLICABILITY

Since the water-in-oil (W/O) emulsion ink for inkjet according to the present invention is excellent in ejection performance and storage stability, it can be used as an ink in the field of inkjet printing, particularly for business printers which adopt the line head type inkjet system.

The invention claimed is:

1. A water-in-oil (W/O) emulsion ink for inkjet, having a water phase dispersed in an oil phase by utilizing a polyglyceryl fatty acid ester (A) and a nonionic surfactant (B) as emulsifiers, in which the fatty acid moiety of the polyglyceryl fatty acid ester (A) is oleic acid or isostearic acid, and the polyglyceryl fatty acid ester (A) has an HLB value of 7-14 and a glycerol polymerization degree of not less than 4, and the nonionic surfactant (B) is at least one selected from the group consisting of:
   (B-a) an esterification product of an organic compound with 3-5 hydroxyl groups and a fatty acid with 18 carbon atoms;
   (B-b) an alkyl glyceryl ether;
   (B-c) a diterpene alcohol; and
   (B-d) a sucrose fatty acid ester having an HLB value of not more than 13.

2. The water-in-oil (W/O) emulsion ink for inkjet according to claim 1, wherein the polyglyceryl fatty acid ester (A) has a glycerol polymerization degree of 4-20.

3. The water-in-oil (W/O) emulsion ink for inkjet according to claim 2, wherein the polyglyceryl fatty acid ester (A) has, in one molecule, 1-3 fatty acids added thereto.

4. The water-in-oil (W/O) emulsion ink for inkjet according to claim 1, wherein the polyglyceryl fatty acid ester (A) has an organic value of 550-2300 and an inorganic value of 600-2500.

5. The water-in-oil (W/O) emulsion ink for inkjet according to claim 1, wherein the esterification product (B-a) of an organic compound with 3-5 hydroxyl groups and a fatty acid with 18 carbon atoms is an esterification product of a monoglycerol or a polyglycerol having a glycerol polymerization degree of not more than 3 and a fatty acid, a sorbitan fatty acid ester, or a pentaerythritol fatty acid ester.

6. The water-in-oil (W/O) emulsion ink for inkjet according to claim 1, wherein the alkyl glyceryl ether (B-b) is one having an alkyl group with 16-18 carbon atoms.

7. The water-in-oil (W/O) emulsion ink for inkjet according to claim 1, wherein the diterpene alcohol (B-c) has no cyclic structure.

8. The water-in-oil (W/O) emulsion ink for inkjet according to claim 7, wherein the diterpene alcohol (B-c) is phytantriol, isophytol or phytol.

9. The water-in-oil (W/O) emulsion ink for inkjet according to claim 1, wherein a blending ratio of the polyglyceryl fatty acid ester (A) to the nonionic surfactant (B) is (A):(B)=50-95:50-5 in mass ratio.

10. The water-in-oil (W/O) emulsion ink for inkjet according to claim 1, which comprises 0.5-40 mass % of the emulsifiers relative to the total amount of the ink.

11. The water-in-oil (W/O) emulsion ink for inkjet according to claim 1, wherein the oil phase contains a pigment, and the water phase contains a water soluble dye.

12. A water-in-oil (W/O) emulsion ink for inkjet, having a water phase dispersed in an oil phase by utilizing a polyglyceryl fatty acid ester (A) as an emulsifier, in which the fatty acid moiety of the polyglyceryl fatty acid ester (A) is oleic acid or isostearic acid, and the polyglyceryl fatty acid ester (A) has an HLB value of 7-14, the ink further comprising a pigment in the oil phase and a water soluble dye in the water phase.

13. The water-in-oil (W/O) emulsion ink for inkjet according to claim 12, wherein the water soluble dye is contained in an amount of 5-30 mass % relative to the whole water phase.

14. The water-in-oil (W/O) emulsion ink for inkjet according to claim 13, wherein the water phase contains a glycerol.

15. The water-in-oil (W/O) emulsion ink for inkjet according to claim 1, wherein the water-in-oil (W/O) emulsion ink for inkjet comprises a combination of the polyglyceryl fatty acid ester (A) and, as the nonionic surfactant (B), (B-a) an esterification product of an organic compound with 3-5 hydroxyl groups and a fatty acid with 18 carbon atoms.

16. The water-in-oil (W/O) emulsion ink for inkjet according to claim 1, wherein the non-ionic surfactant is (B-a) and comprises sorbitan sesquiisostearate or pentaerythritol monostearate.

17. The water-in-oil (W/O) emulsion ink for inkjet according to claim 1, wherein the water-in-oil (W/O) emulsion ink for inkjet comprises a combination of the polyglyceryl fatty acid ester (A) and, as the nonionic surfactant (B), (B-b) an alkyl glyceryl ether.

18. The water-in-oil (W/O) emulsion ink for inkjet according to claim 1, wherein the non-ionic surfactant is an alkyl glyceryl ether (B-b) and comprises monoisostearyl glyceryl ether, monocetyl glyceryl ether, monooleyl glyceryl ether, or monostearyl glyceryl ether.

19. The water-in-oil (W/O) emulsion ink for inkjet according to claim 1, wherein the water-in-oil (W/O) emulsion ink for inkjet comprises a combination of the polyglyceryl fatty acid ester (A) and as the nonionic surfactant (B), (B-c) a diterpene alcohol.

20. The water-in-oil (W/O) emulsion ink for inkjet according to claim 19, wherein the diterpene alcohol (B-c) has no cyclic structure.

21. The water-in-oil (W/O) emulsion ink for inkjet according to claim 19, wherein the diterpene alcohol (B-c) is phytantriol, isophytol or phytol.

22. The water-in-oil (W/O) emulsion ink for inkjet according to claim 1, wherein the water-in-oil (W/O) emulsion ink for inkjet comprises a combination of the polyglyceryl fatty acid ester (A) and, as the nonionic surfactant (B), (B-d) a sucrose fatty acid ester having an HLB value of not more than 13.

23. The water-in-oil (W/O) emulsion ink for inkjet according to claim 1, wherein the water-in-oil (W/O) emulsion ink for inkjet comprises a combination of the polyglyceryl fatty acid ester (A) and, as the nonionic surfactant (B), (B-d) a sucrose fatty acid ester comprising sucrose stearate.

* * * * *